United States Patent
Stevenson et al.

(10) Patent No.: US 7,174,918 B2
(45) Date of Patent: Feb. 13, 2007

(54) AIR FLOW CONTROL VALVE FOR VEHICLE AIR CONDITIONING MODULE

(75) Inventors: Mark W. Stevenson, Appleton, NY (US); Gregory J. Kowalski, Cambria, NY (US)

(73) Assignee: Delphi Technologies, Inc., Troy, MI (US)

( * ) Notice: Subject to any disclaimer, the term of this patent is extended or adjusted under 35 U.S.C. 154(b) by 67 days.

(21) Appl. No.: 11/047,933

(22) Filed: Feb. 1, 2005

(65) Prior Publication Data

US 2006/0169340 A1  Aug. 3, 2006

(51) Int. Cl.
    *F16K 11/18* (2006.01)
(52) U.S. Cl. .................. 137/883; 251/251; 454/139
(58) Field of Classification Search ............... 137/883; 251/251, 318; 454/139, 142
    See application file for complete search history.

(56) References Cited

U.S. PATENT DOCUMENTS

| | | | |
|---|---|---|---|
| 2,638,120 A * | 5/1953 | Stenkvist et al. ...... | 137/601.15 |
| 3,765,316 A * | 10/1973 | Skoch .................. | 454/292 |
| 4,404,987 A * | 9/1983 | Bridigum et al. ....... | 137/556 |
| 4,683,913 A | 8/1987 | Hoffman et al. ........ | 137/625.4 |
| 4,828,018 A | 5/1989 | Hoffman .............. | 165/42 |
| 5,009,392 A | 4/1991 | Ostrand .............. | 251/180 |
| 5,070,770 A | 12/1991 | Cassidy .............. | 999/2.08 |
| 5,080,140 A | 1/1992 | Ostrand et al. ....... | 137/875 |
| 5,228,475 A | 7/1993 | Trill ................. | 137/875 |
| 5,983,657 A | 11/1999 | Murata et al. ........ | 62/228.3 |
| 6,321,780 B1 * | 11/2001 | Iwabuchi ............. | 137/341 |
| 6,368,207 B1 | 4/2002 | McLaughlin et al. .... | 454/156 |
| 6,547,152 B1 | 4/2003 | Pawlak, III .......... | 237/12.3 B |

FOREIGN PATENT DOCUMENTS

| | | |
|---|---|---|
| DE | 7439796 | 7/1977 |
| EP | 1205320 | 5/2002 |
| GB | 2123947 | 2/1984 |

OTHER PUBLICATIONS

EP 06075170—European Search Report—dated May 4, 2006.

* cited by examiner

*Primary Examiner*—John Fox
(74) *Attorney, Agent, or Firm*—Patrick M. Griffin (57) ABSTRACT

A novel air flow control valve for an air outlet in an HVAC housing provides for strong, even seal pressure all the way around the edge of the opening. In stead of a swinging door hinged at one edge of the opening, in which seal pressure is strong on the hinge edge but weaker on the opposite edge, a flat panel is moved straight toward and away from the opening. In the closed position, the sealing pressure is even all the way around. The sealing panel is moved back and forth by a rotary cam mechanism.

3 Claims, 8 Drawing Sheets

AIR FLOW CONTROL VALVE FOR VEHICLE AIR CONDITIONING MODULE

TECHNICAL FIELD

This invention relates to vehicular heating, ventilation and air conditioning module air control valves.

BACKGROUND OF THE INVENTION

The air flow control valves used automotive air conditioning and ventilation systems (typically abbreviated as "HVAC systems") generally have a large, generally box shaped plenum or housing containing an evaporator (cold air source), heater core (hot air source) and several air directing and handling mechanisms that determine the mix of hot and cold air streams, so as to achieve a desired temperature, and also the ultimate exit point of tempered air within the vehicle interior, generally referred to as mode control.

Figure 1:
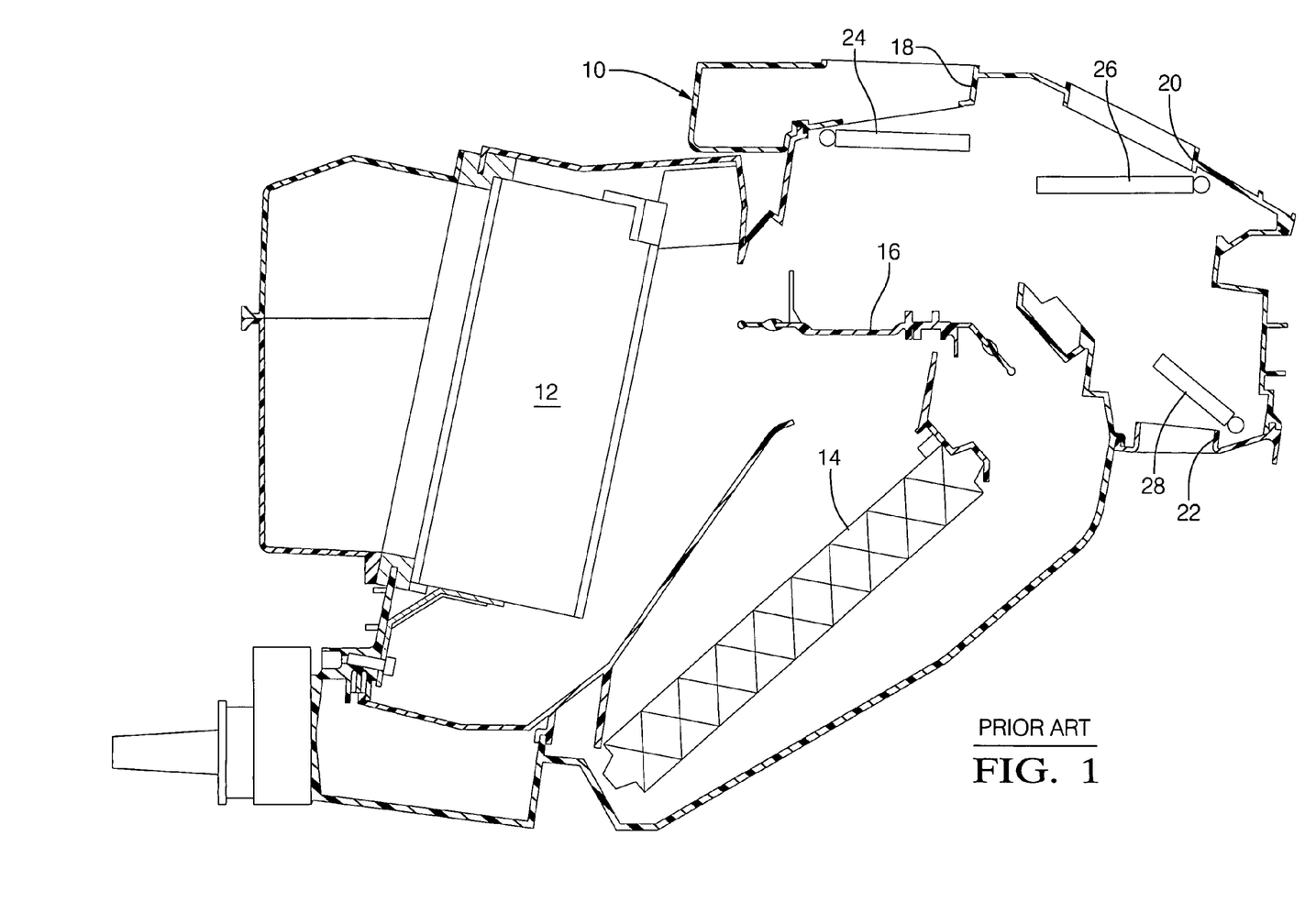
FIG. 1 is cross section of a standard HVAC housing and heat exchangers with standard flapper doors controlling the three air outlets.

A typical HVAC system is illustrated in FIG. 1. Box shaped housing 10 contains an evaporator 12 and heater core 14, arranged so that forced air (from a non illustrated blower) all flows through evaporator 12, and then through heater core 14 (or not) in a proportion determined by the relative position of a swinging door type temperature valve 16. As illustrated, temperature door 16 is in a mid position, so that a stream of both hot and cold air travel upwardly to a common area above which are located several potential exit ports into the vehicle interior. Typically, these comprise an uppermost defroster outlet 18, a midlevel air outlet 20, and lowermost, floor directed, heater outlet 22. These various outlets are best distinguished by their location, rather than the temperature of the air that is directed to them, since that air may have any temperature, achieved by mixing the two air streams. Achieving a thorough air mix has been a continuing problem, however, because of a tendency for the distinct cold and hot air streams to remain stratified.

Another continuing problem has been providing for mode control, that is, the selective opening and closing of the three possible air outlets, in a fashion that is effective in terms of sealing efficiency, occupied space, and cost. The most common opening and closing mechanisms found in production are flapper door type valves, as illustrated in FIG. 1 at 24, 26 and 28, respectively. Such doors are pivoted back and forth by individual motor and gear drives, which act about an axle at the rear edge of the doors. As such the sealing force applied at the remote outer edge of the doors is potentially compromised. An analogy would be closing a book by pinching the covers together at a point near the spine. The closing force would be strongest near the spine, but questionable at the outer edges of the pages. The flapper door closing force issue is also affected by the common practice of using a layer of foam on the door, which must be compressed against the lip of the opening by the closing force applied to the door.

Many alternatives to flapper door valves have been proposed. Among these are continuous belts, so called film valves, in which a belt of flexible material is rolled back and forth in order to cover and uncover vent] openings. Film valves are effective, but costly, and can require a substantial redesign of the housing or module to accommodate them. Other proposals have included rotating barrels, butterfly valves, arcuate sliding doors, and articulated, "roll top desk" type panels. One distinctive design, disclosed in U.S. Pat. No. 5,228,475 is a swinging panel that pulls flat against the lip of an opening, and thereby provides even, strong sealing force. However, it swings up and down between two adjacent openings, rather than covering and uncovering a single opening to a greater or lesser extent. All of the aforementioned proposals are generally not capable of being simply substituted for flapper type doors to open and close individual vent openings, with little or no change to the layout of the housing itself.

SUMMARY OF THE INVENTION

The subject invention provides an alternative to a flapper door that can be used in a standard housing, but which provides for a stronger, more even sealing force, as well as providing improved air mixing.

In the preferred embodiment disclosed, a cam on a rotary shaft pushes and pulls an internally guided, flat sealing panel toward or away from a vent opening, moving generally parallel to the plane of the vent opening. The degree of opening can be controlled by how far the cam is turned, and the sealing force is applied evenly, since the sealing panel is pushed straight into the vent opening, without favoring one side or the other of the opening. The vent opening itself can be the same shape, and in the same location as in a conventional, flapper door housing. In addition, multiple sealing panels can be moved back and forth simultaneously, by multiple cams on a single shaft. The sealing panels, set back from the vent opening and preventing a direct outflow of air, can cause a swirling, vortex pattern in the forced air as it encounters the rear of the sealing panels and then rushes around the edges of the panels, thereby helping to mix various air streams and reduce stratification.

DESCRIPTION OF THE PREFERRED EMBODIMENT

Figure 2:
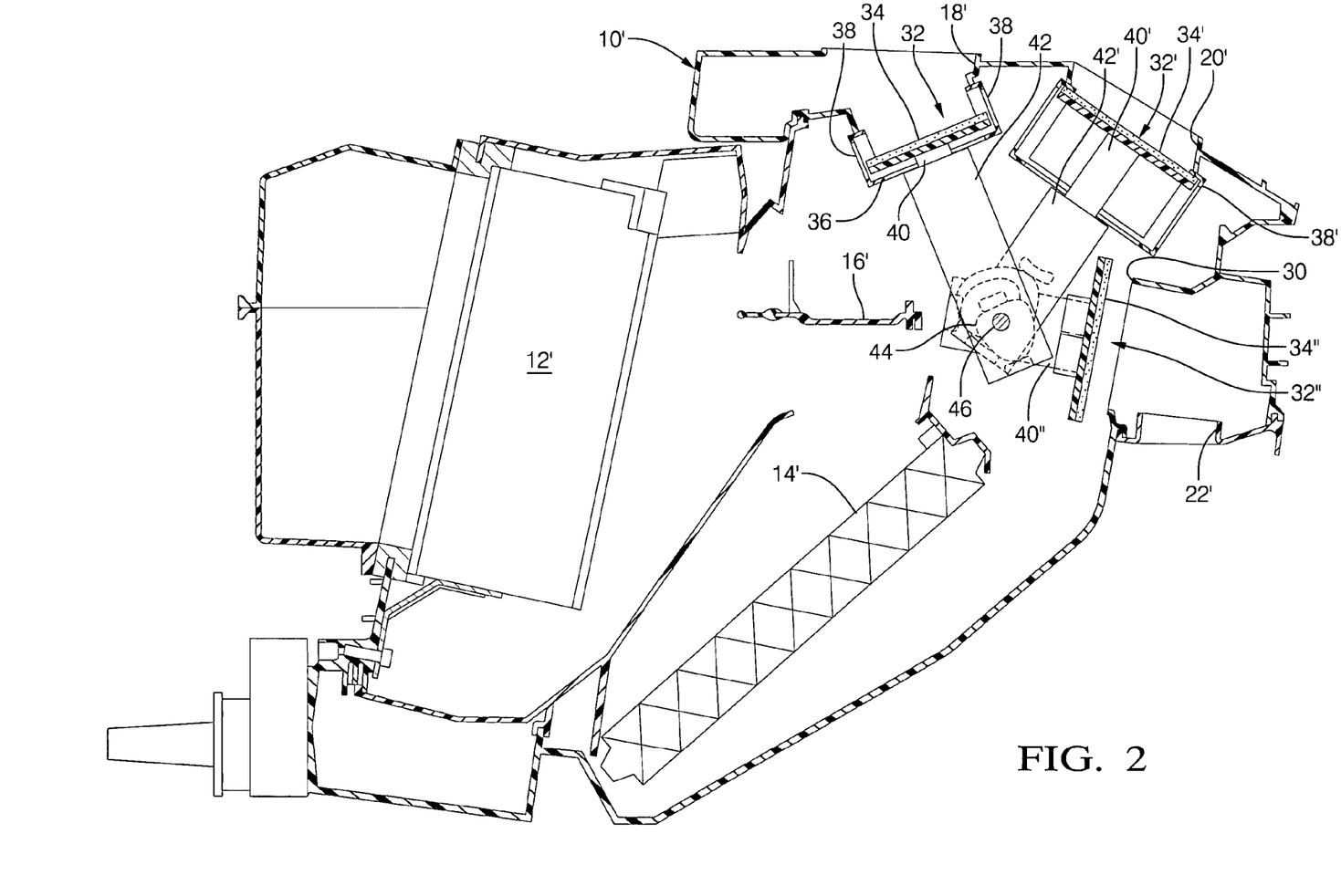
FIG. 2 is a cross section of the same HVAC housing, with the opening and closing valve of the invention substituted.

Referring first to FIG. 2, the environment in which the improved opening and closing valve of the subject invention is the same HVAC housing described above, indicated at 10', with other identical or nearly identical features also identified with the same number primed. The invention is capable of being easily incorporated into such a standard HVAC housing, with little or no change. One change made to accommodate the invention is that the heater outlet 22', rather than being directly opened and closed, is backed by a new, more vertically oriented sealing opening indicated at 30. Each of the three outlets to be opened and closed, 18', 20' and 22' (30) is defined by a substantially planar, rectangular perimeter edge, of the same type and size that was previously opened and closed by an individually operated flapper door. The outlets need not be absolutely planar. They could, for example, be a section of the surface of a cylinder. Either way, an opening will have a perimeter edge, typically four sided, and a pre determined linear path associated with that perimeter edge that can be considered "straight back and forth" relative to that perimeter edge. For example, in the case of a perimeter edge lying all in a plane, that path would be a straight line perpendicular to that plane. In the case of an opening that was a section of a cylinder, the path would lie on a radius of the cylinder section. The existence of such a pre determined geometrical line relative to the perimeter edge of the vent opening is used to good effect by the invention, details of which are described below.

Figure 3:
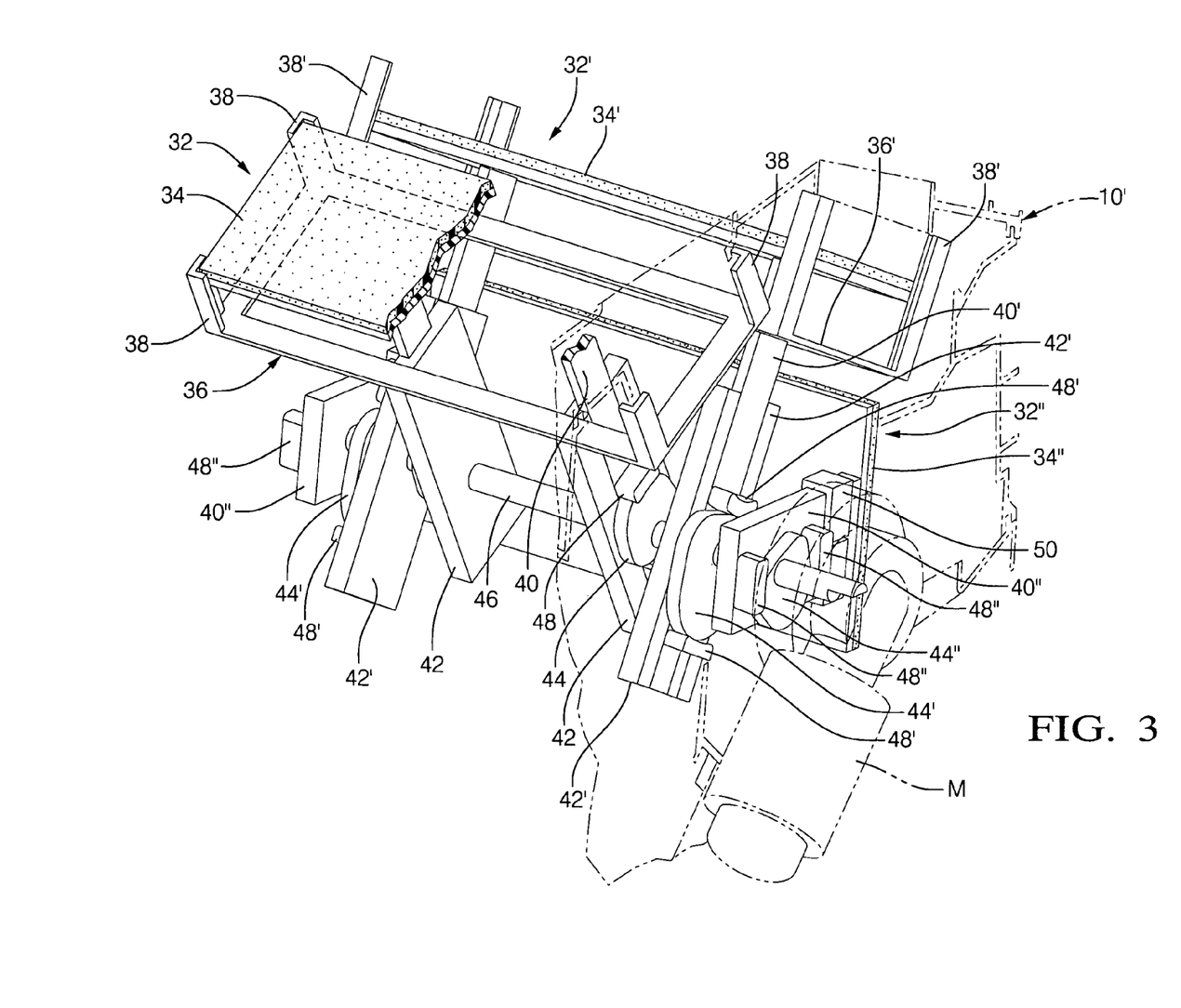
FIG. 3 is a perspective view of three valves according to the invention.

Referring next to FIG. 3, the opening and closing valve of the invention, a preferred embodiment of which is indicated generally at 32, is used to open and close each of the air outlets 18', 20' and 22' (30) noted above. The valve 32 is used in conjunction with the defroster outlet 18', and is chosen only because it is the one most easily visible from the perspective of FIG. 3. Each opening and closing valve 32 can be independently operated, although they are illustrated as being concurrently operated. Regardless, each valve 32 has basically the same components. Valve 32 includes a flat sealing panel 34, the upper surface of which may carry a layer of foam or other sealing material, if desired. Alternatively, the perimeter edge of the outlet to be sealed could carry a compressible sealing material. Sealing panel 34 is flat because the perimeter edge of the defroster outlet 18' that it opens and closes lies in a flat plane, and its outer edge is slightly larger in terms of surface area. An open guiding frame 36 is rigidly attached to the interior of the housing 10' so that four corner channels 38 thereof are oriented generally perpendicular to the plane of the perimeter edge of defroster outlet 18'. The corner channels 38 closely, but not tightly, engage the corners of sealing panel 34 so that it can move straight back and forth, toward and away from the outlet 18', far enough forward to seal tightly against it, and far enough back to create sufficient open area between panel 34 and the outlet 18' to allow adequate air flow area around the edges of paentl 34 to exit outlet 18'. The back of panel 34 is supported by a pair of spaced, parallel stanchions 40, each of which, in turn, is slidably received in a pair of parallel guide channels 42 that are rigidly attached to the fixed guide frame 36. The guide channels 42 and corner channels 38 together cooperate to guide stanchions 40 and the sealing panel 34 supported thereon in the back and forth, linear path desired.

Figure 4:
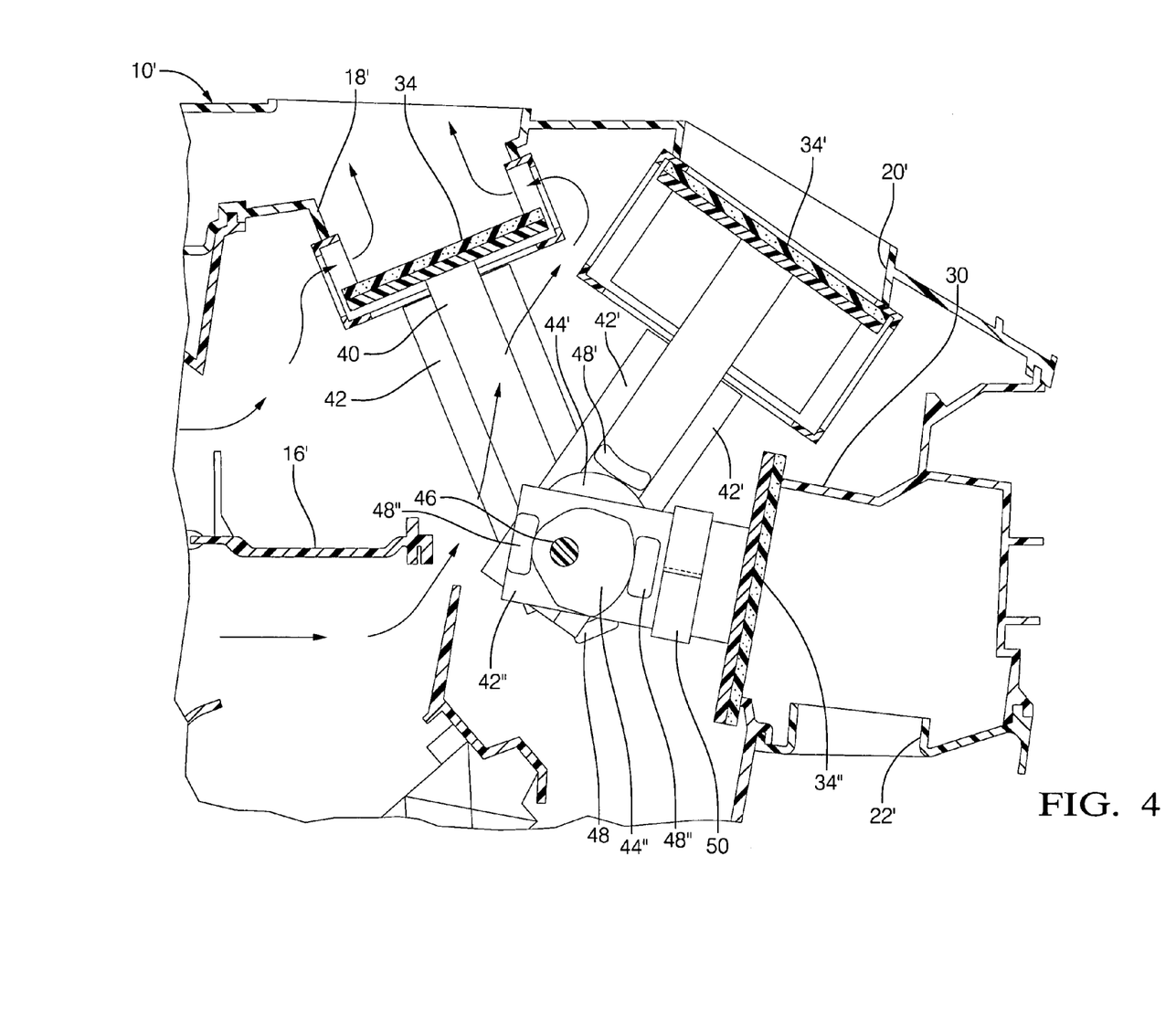
FIG. 4 through 8 are views showing various moved positions of the valves.
Figure 5:
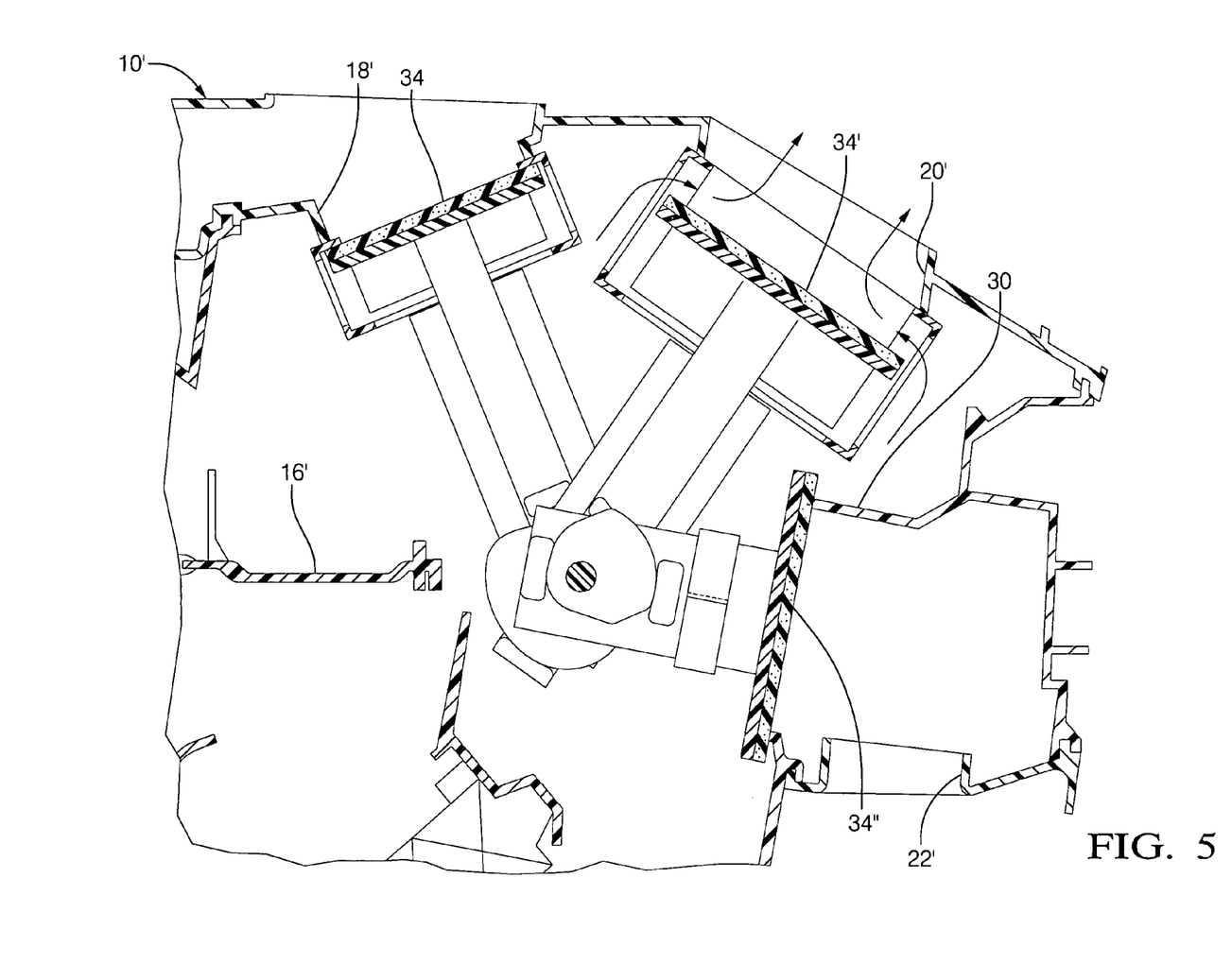

Referring next to FIGS. 3 and 4, the actual movement is of panel 34 provided by a pair of parallel rotary cams 44 on a rotatable cam shaft 46, which is pivoted freely through the guide channels 42 and turns back and forth on a fixed axis that is located behind the sealing panel 34, perpendicular to the desired path of linear motion. Cam shaft 46 can be turned selectively by any suitable power source, such as an electric motor M mounted inside or outside the housing 10', or a mechanically powered cable or flex shaft turned manually from inside the vehicle. Shaft 46 also passes through non-visible clearance slots in the stanchions 40. Each cam 44 rides closely in a cam slot defined by a pair of cam shoes 48 on each stanchion 40, located above and below the non-visible clearance slots. As cam shaft 46 turns, the rotary cams 44 push up or down on one of the spaced cam shoes 48 to move the stanchions 40 and sealing panel 34 back and forth, guided by the guide channels 42 and corner channels 38, This moves the panel 34 to toward and away from the perimeter edge of defroster outlet 18', sealing it closed (FIG. 3), or pulling away to open it to a varying degree (FIG. 4, as shown by the dotted lines). The pressure of the edge of the rotary cams 44 against the upper cam shoes 48, applied perpendicularly to the back of sealing panel 34 through the spaced stanchions 40, is distributed strongly and evenly all around the perimeter edge of outlet 18'. Consequently, the sealing material is strongly and evenly compressed, with no concentration or diminution of force at any part of the perimeter edge.

Referring next to FIGS. 2 and 3, more than one valve can be operated simultaneously from the single cam shaft 46, if desired. As disclosed, the sealing mechanisms for the other two outlet openings 20' and 22' (30) are comprised of almost identical components, indicated by the same numbers with a prime for the mid level air outlet 20' and by a double prime for the lower or heater outlet 22' (30). The stanchions 40' for sealing panel 34' are nested just outside the stanchions 40, while the stanchions 40" for sealing panel 34" are nested outside the stanchions 40'. So, too, the sets of rotary cams 44, 44' and 44" are nested one within the other, and all fixed to the same shaft 46. The only significant difference illustrated is that the guiding frame for the outermost stanchions 40" supporting lowermost sealing panel 34" consists simply of a pair of collars 50 fixed to the interior of housing 10', through which the stanchions 40" slide. This is strictly a matter of space savings and does not affect the basic structure or operation.

Figure 6:
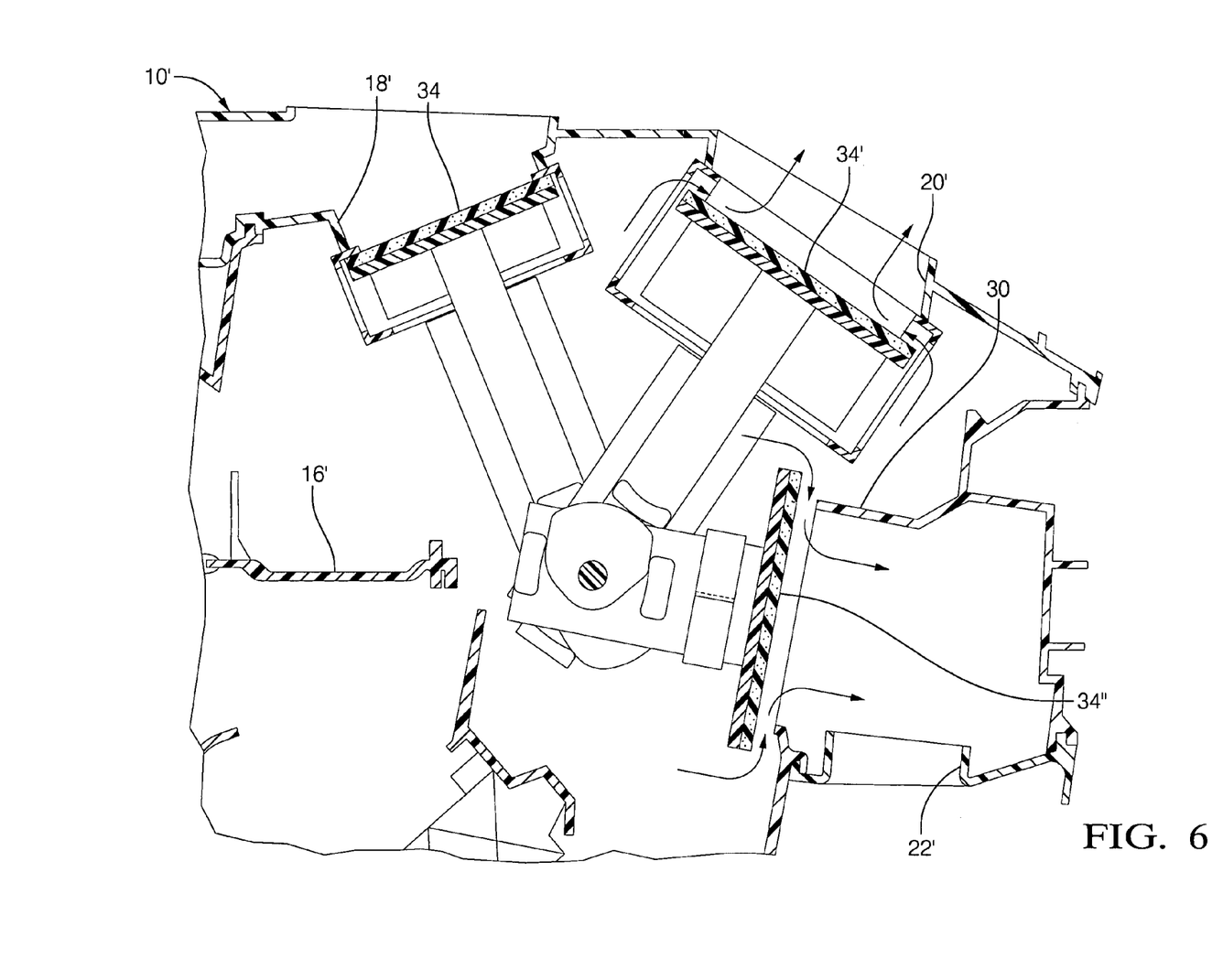
Figure 7:
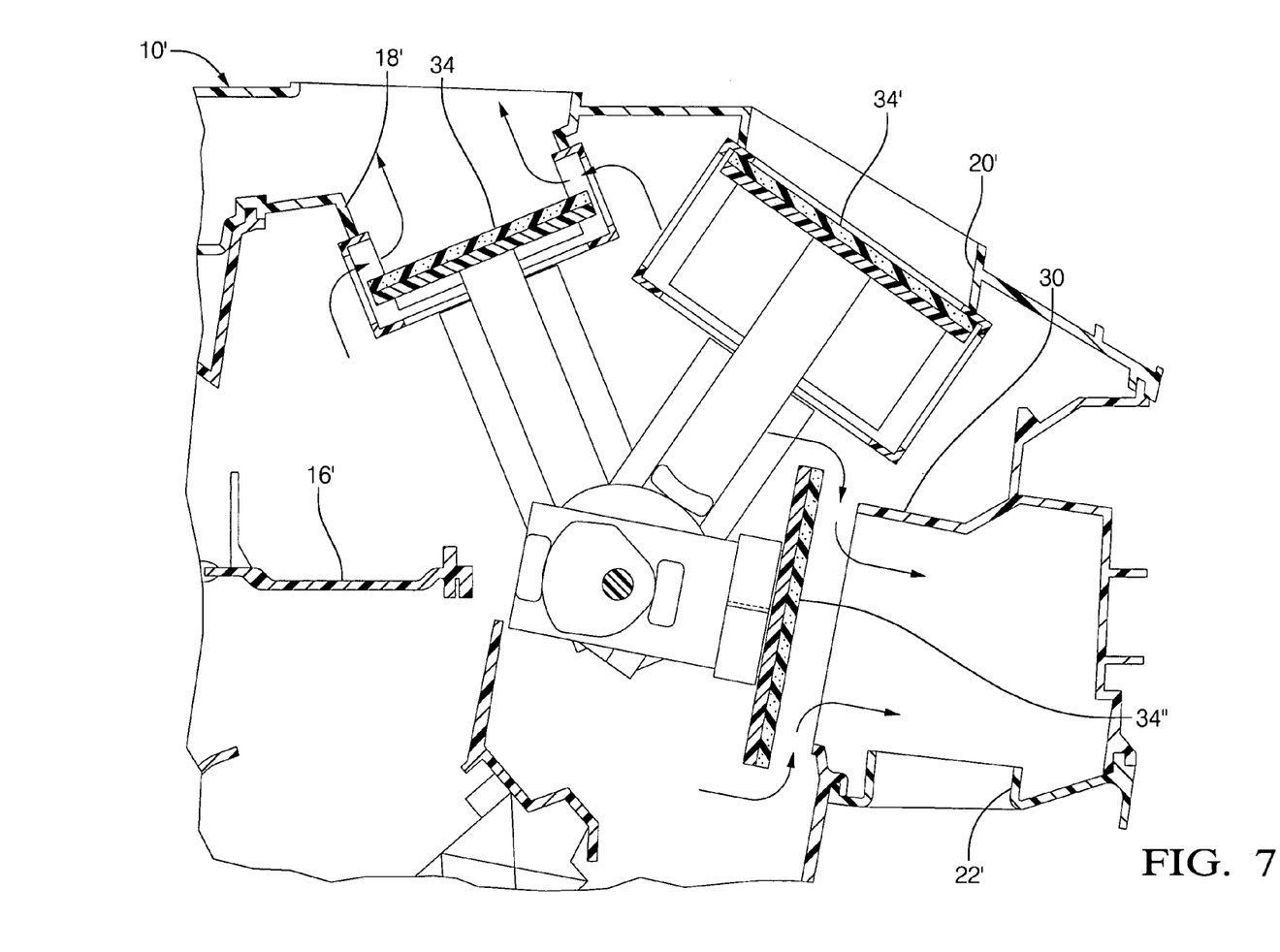
Figure 8:
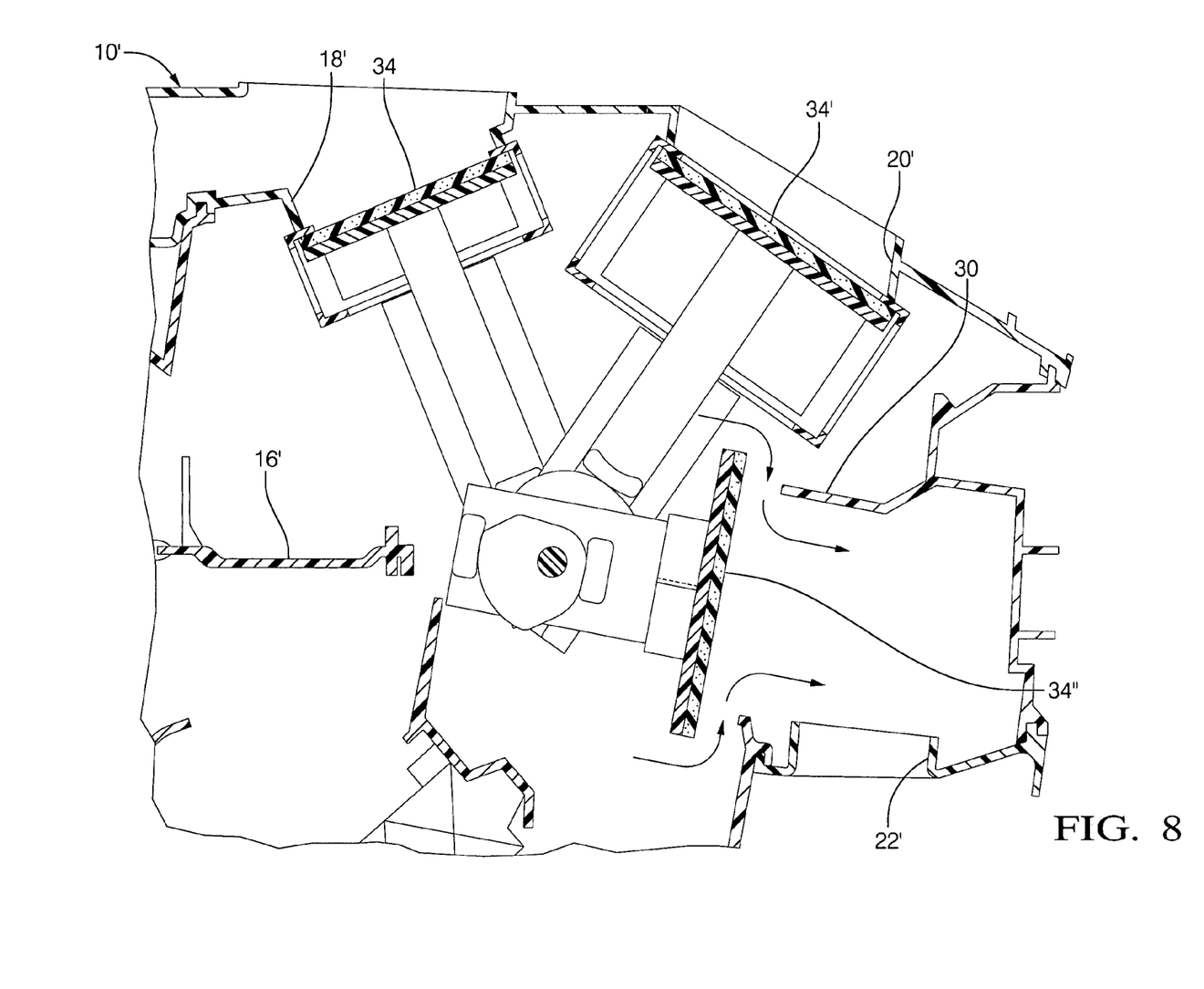

Referring next to FIGS. 5 through 8 various possible moved positions are shown. In general, when cam shaft 46 is turned, the relative orientation of the three sets of rotary cams 44, 44 and 44" on the shaft 46 cause the three sealing panels 34, 34' and 34" to move toward or away from their respective air outlets 18', 20' and 22'(30) to different degrees, simultaneously. This is an efficient scheme in terms of total components, although it limits flexibility in terms of being able to provide all possible combinations of opening or closing of the three outlets. Specifically, in FIG. 5, only valve 34' and midlevel outlet 20' are open. In FIG. 6, both valves 34', 34" and midlevel outlet 20' and heater outlet 22' are open. In FIG. 7, valves 34 and 34", and defroster outlet 18' and heater outlet 22' are open. In FIG. 8, only valve 34" and heater outlet 22' are open. Of course, all three mechanisms could be operated independently by three separate, and separately powered, drive shafts. Or, a single power source, such as a motor, could drive three different cam shafts at different rates, through a gear mechanism. Regardless, all mechanisms will have the same basic advantage of sealing tightly and evenly all around the perimeter edges of the various outlet openings, and can be incorporated in a basically conventional housing without changing the shape or relative orientation of those outlet openings.

Referring to FIGS. 2 and 4, another advantage of the invention is the effect that it can have in preventing the type of hot-cold air stream stratification described above, and in promoting mixing of the air streams. The temperature door 16' still functions identically to that described above, and splits cold (upper) and hot (lower) air streams coming through the evaporator 12' and heater core 14'. The cold and hot air streams now do not have as clear or unobstructed a flow path out through the various air outlet openings as before. While air streams can flow freely through and between the various sets of nested stanchions 40, 40' and 40", they then hit the backs of the various sealing panels 34, 34', and 34" attached thereto, which are located directly back from their respective outlet openings. Thus, for example, an upper, cold air stream hits the back of sealing panel 34, and is temporarily blocked before it can swirl around the edges of sealing panel 34 and out defroster outlet 18'. Even when a sealing panel is retracted only a relatively short distance from a perimeter edge, adequate outflow area is provided, since all four edges of the outlet are uncovered, and uncovered to the same degree. This, as opposed to a conventional flapper door, which leaves the outlet edge to which it is pivoted blocked and the side edges adjacent thereto only partially unblocked. In a similar fashion, some of the cold air stream is deflected down and behind the adjacent sealing panel 34'. The lower, hot air stream, engaging the back of sealing panel 34', is likewise temporarily blocked and partially deflected toward the adjacent sealing panel 34. In a case where both the defroster outlet 18' and mid level outlet 20' are open, the hot and cold air streams that could have otherwise remain stratified as they exited are now well mixed, both by the blocking-deflecting action of the backs of the retracted sealing panels, and by the swirling action caused as the air rushes around the edges thereof. This additional mixing action is a free by product, in effect, of the structure used for the primary intent of providing a stronger, more even sealing force.

As noted above, variations of the embodiments disclosed could be made. Essentially any air outlet shape having a continuous perimeter edge is capable of being completely closed by sealing panel of matching shape, be it flat or curved, rectangular or round or other shape, moved toward and away from it the vent opening, in a linear path. The cam mechanism disclosed, by converting the rotary motion of the shaft located behind the panel into linear motion, moves the sealing panel in that linear path. Any such outlet opening, however shaped, will receive a strong and evenly distributed sealing force by a closure panel of matching shape, moved in the guided linear path shown. One, or two, or more vent openings can be handled, sometimes by a single cam shaft, if the relative orientations of the openings and their desired relative open and closed combinations, are amenable. Cam slots could be provided directly through the support stanchions 40, rather than by separately formed and spaced cam shoes 48. For smaller vent openings and proportionately smaller sealing panels, a single support stanchion could provide sufficient support and stability. Therefore, it will be understood that it is not intended to limit the invention to just the embodiments disclosed.

The invention claimed is:

1. A valve for opening and closing an air outlet opening in a housing defined by a continuous perimeter edge, comprising,
    a continuous sealing panel having a shape substantially matching the air outlet opening and capable of being moved in a defined linear path against and away from the outlet opening's perimeter edge,
    a support member comprising a pair of parallel stanchions on the rear of said panel and having a cam slot therein,
    a guide frame fixed within said housing to support said sealing panel and support member for guided movement along said liner path, said guide frame includes a pair of parallel channels in which said stanchions slide,
    a rotary shaft located behind said panel and oriented substantially perpendicular to said linear path, and,
    a rotary cam on said rotary shaft operable within said support member cam slot to move said support member within said guide frame along said linear path against and away from the perimeter edge defining said air outlet opening.

2. A valve according to claim 1, in which said air outlet perimeter edge is generally rectangular and disposed in a plane, and in which said sealing panel is generally rectangular.

3. A valve according to claim 1, in which said guide frame further includes parallel corner channels in which the corners of said sealing panel slide.

* * * * *